Patented Mar. 28, 1950

2,502,150

UNITED STATES PATENT OFFICE 2,502,150

O,O'-DI(NICOTINAMIDO)DIPHENYL-SULFIDES

Edwin Oscar Hook, Old Greenwich, Conn., assignor to American Cyanamid Company, New York, N. Y., a corporation of Maine No Drawing. Application November 6, 1948, Serial No. 58,795

2 Claims. (Cl. 260—295.5)

This invention relates to a novel group of chemical compounds, the di(nicotinamido)diphenyldisulfides, which may be represented generically by the type formula

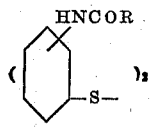

wherein R is the nicotinoyl radical.

While the compounds of the present invention may be prepared by any desired method, the more simple methods are to be preferred. One suitable and effective method is to react a di(aminophenyl)disulfide with the acid chloride of nicotinic acid. Reaction is readily carried out by adding the acid chloride to a solution of the diaminodisulfide in any suitable basic solvent such as pyridine or the like. When addition is complete and the mixture is at about room temperature, it is drowned in water. The product separates out, generally, but not necessarily, as an oil which soon solidifies or crystallizes. This product is then collected and purified by crystallization.

While other uses are contemplated, the compounds of the present invention have special interest as peptizers in reducing the milling time required to obtain a desired plasticity or degree of softness with any natural and synthetic rubbers which can be plasticized by mechanical working in the presence of oxygen. This property appears to be common to some extent to the entire group. The ortho,ortho' compound, however, is particularly effective. These compounds when so used have been found not only to be free from objectionable odors, but also the tendency to produce physiological reactions on the skin of the user, objections applicable to many of the less effective compounds now used for the purpose.

Preparation of the compounds of the present invention is shown in the following example. It is intended as illustrative only and not by way of limitation. All parts are by weight unless otherwise noted.

Example 25 parts of nicotinic acid and 50 parts $SOCl_2$ are combined and heated for several hours on a steam bath, after which the excess thionyl chloride is removed by distillation under reduced pressure. To the residue is added a solution of 25 parts of o,o'-di(aminodiphenyl)disulphide in 70 parts of an equal mixture by volume of pyridine and benzene, the mixture being combined with stirring at room temperature. It is then heated for about ½ hour on a steam bath and the excess solvent is removed under reduced pressure. The residue is washed with ice-water until it crystallizes on standing, and the crystals are recrystallized from ethanol. The product o,o'-di(nicotinamido)diphenyldisulfide softens at 148° C. and melts at 152°–154° C. (unc.).

By simple substitution of the m,m'- or p,p'-diaminodiphenyldisulfide the corresponding dinicotinoyl derivative is obtained.

I claim:

1. A di(heterocyclicacylamino)diphenyldisulfide of the type formula

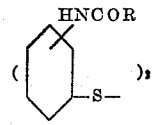

wherein COR is the nicotinoyl radical.

2. A di(heterocyclicacylamino)diphenyldisulfide of the type formula

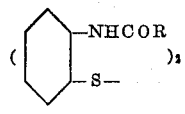

wherein COR is the nicotinoyl radical.

EDWIN OSCAR HOOK.

No references cited.